United States Patent
Yamamoto et al.

[15] 3,653,480
[45] Apr. 4, 1972

[54] AUTOMATIC VENDING SYSTEM

[72] Inventors: Mititaka Yamamoto; Masanori Nagata, both of Kyoto, Japan

[73] Assignee: Omron Tateisi Electronics Co., Kyoto, Japan

[22] Filed: Oct. 9, 1969

[21] Appl. No.: 865,082

[30] Foreign Application Priority Data

Oct. 14, 1968 Japan..................................43/74886

[52] U.S. Cl. ..............................................................194/4
[51] Int. Cl. ..........................................................G07f 1/06
[58] Field of Search......................................................194/4

[56] References Cited

UNITED STATES PATENTS

| | | | |
|---|---|---|---|
| 1,976,585 | 10/1934 | Tauschek | 194/4 R |
| 2,783,865 | 3/1957 | Cleave | 194/4 R |
| 2,794,869 | 6/1957 | Noregaard | 194/4 R |
| 3,221,304 | 11/1965 | Enikeieff et al. | 194/4 R |
| 3,302,828 | 2/1967 | Gomez et al. | 194/4 R |

*Primary Examiner*—Samuel F. Coleman
*Attorney*—Christensen & Sanborn

[57] ABSTRACT

An automatic vending system in which cards having predetermined monetary values accorded thereto are utilized to purchase an article or service. The system comprises, in combination, a card issuance control device, an article dispensation control device and a card-to-cash conversion control device. By presenting a desired amount of money to the system, the customer may obtain a card having the corresponding monetary value accorded thereto. The owner of a card may obtain an article or service by using the card in the system. When a purchase has been made, the price of the article purchased is subtracted from the monetary value the card had prior to the purchase, and the resultant new monetary value is written on the card in place of the original monetary value thereof. The owner of a card may at any time have the card converted to cash corresponding to the monetary value the card then has.

3 Claims, 4 Drawing Figures

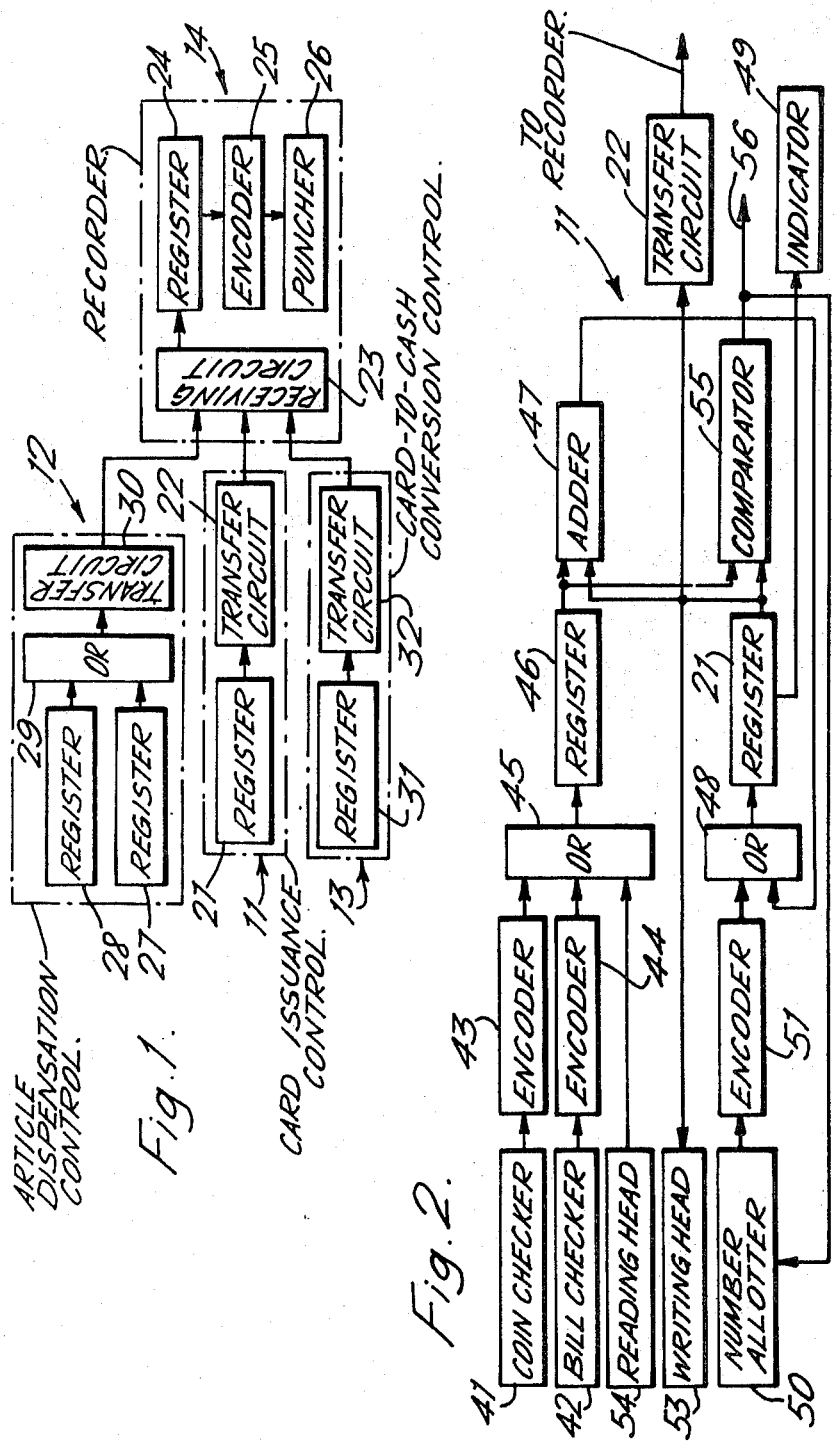

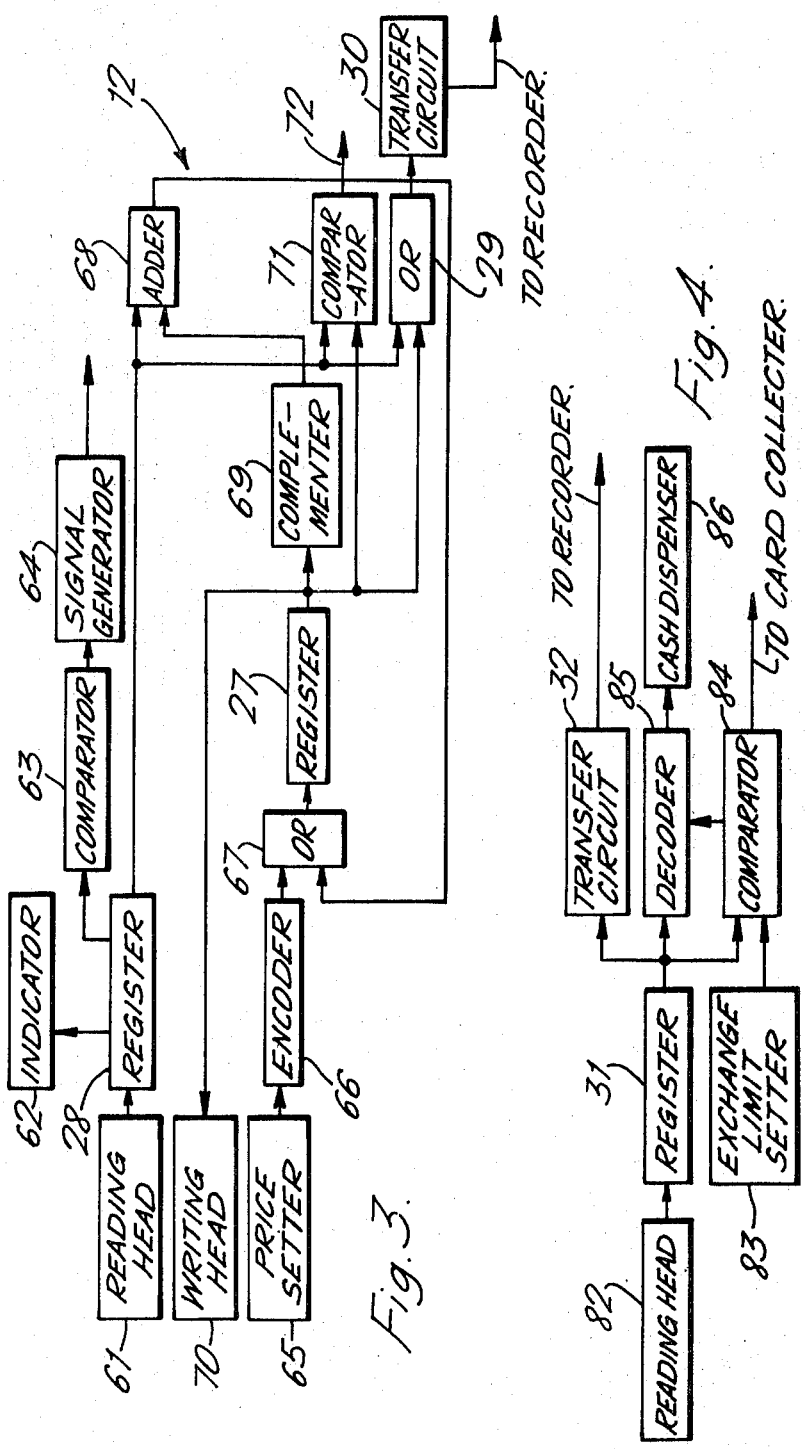

AUTOMATIC VENDING SYSTEM

This invention relates to an automatic vending system in which cards having predetermined monetary values accorded thereto are used to buy articles or service.

Known automatic vending machines may be classified into two types. One is that in which credit cards are used and the other is that in which coins or tokens are used. In the former type, articles can be purchased on credit, so that users of the machine are very likely to buy more articles than they actually need. This is very uneconomical. In the latter type, the user of the machine must have coins or tokens at hand. This is quite inconvenient. If cards are accorded monetary values so that they can be used in the machine for purchase of an article or service the monetary value of which does not exceed that of the card used, it would be more economical and convenient to the users of the machine.

Accordingly, the primary object of the invention is to provide an automatic vending system in which cards having predetermined monetary values given thereto are used to purchase articles or service.

Another object of the invention is to provide an automatic vending system which is provided with a card issuance control device, an article dispensation control device and a card-to-cash conversion control device. The article dispensation control device performs not only the original function of dispensing articles but also the additional function of changing the monetary value of the card. When a card is used in the vending machine to purchase an article therefrom, the price of the article is subtracted from the value of the card used, so that the monetary value of the card is rewritten so as to have a new value corresponding to the result of the subtraction.

The card issuance control device functions so that when a customer introduces money into the machine, a card having a monetary value corresponding to the money introduced is handed to the customer.

The card-to-cash conversion control device functions so that when the owner of a card presents the card to the machine, cash money corresponding to the monetary value of the card is returned to the owner in exchange for the card.

As the owner of a card uses the card to purchase articles or service, the monetary value of the card decreases until the remaining value is no longer sufficient to purchase an article or service. Sometimes the owner of a card may wish to have cash. In such cases, it would be very convenient to have cash corresponding to the monetary value of the card returned to the owner.

The invention will become more apparent from the following detailed description of a preferred embodiment thereof with reference to the accompanying drawings, wherein:

FIG. 1 is a block diagram showing the general layout of the system of the invention;

FIG. 2 is a block diagram of the card issuance control device included in the system of FIG. 1;

FIG. 3 is a block diagram of the article dispensation control device included in the system of FIG. 1; and FIG. 4 is a block diagram of the card-to-cash conversion control device in the system of the invention.

Referring to FIG. 1, there is shown an automatic vending system comprising a card issuance control device 11, an article dispensation control device 12 and a card-to-cash conversion control device 13. The card issuance control device 11 includes a register 21 which stores the value of the money a customer offers and the identification number of the customer. The device magnetically records the stored monetary value and identification number of the customer and then issues that card to the customer. The card will be used in the system to control the article dispensation control device 12 or the card-to-cash conversion control device 13. The monetary value and the identification number stored in the register 21 are transferred by a transfer circuit 22 to a recorder 14, wherein a receiving circuit 23 receives the signal from the circuit 22 and the output from the circuit 23 is applied to a register 24 to be temporarily stored therein. The contents in the register 24 are converted by an encoder 25 to a suitable code, which is applied to a puncher 26. The puncher 26 punches a suitable tape to record thereon the input information received from the circuit 25.

In the above description, the card is automatically prepared and issued to the customer. The operation may be manually performed, if desired. The recorder 14 may be eliminated if there is no need for obtaining the total of the sales made and other information for statistical purposes.

The article dispensation control circuit 12 is annexed to an automatic vending machine of a known suitable type, not shown. The circuit 12 not only controls the article dispensing operation of the machine but also performs the subtraction of the price of the article sold from the monetary value of the card introduced into the machine and rewrites the value of the card so that the card now has a new value corresponding to the result of the subtraction, and then returns the card to its owner. The article dispensation control device 12 includes a register 27 which stores the result of the subtraction and a register 28 which stores the identification number of the card. The information stored in the registers 27 and 28 is applied through an OR circuit 29 and a transfer circuit 30 to the recorder 14 to be recorded therein in the manner previously mentioned.

The card-to-cash conversion control device 13 is annexed to a money exchanging machine, not shown, of a similar construction to the above-mentioned typical automatic vending machine. The money exchanging machine may be considered as a kind of an automatic vending machine in which the article to be dispensed is cash money. The device 13 reads the identification number and the remaining monetary value of the card introduced and dispenses cash in the amount corresponding to the monetary value of the card. The information about the card identification number and the card value is stored in a register 31 and then sent by means of a transfer circuit 32 to the recorder 14 to be recorded in the same manner as previously mentioned.

The information about the issuance of cards, the sales made and the amount of money exchanged may be used for management and statistical purposes.

Turning to FIG. 2, which shows a detailed arrangement of the card issuance control device 11. When a customer wishes to have a card, he or she presents a required amount of money to the machine. If the money is in the form of coins, they are checked with respect to their genuineness by a coin checker 41 and if it is in the form of bills, they are checked by a bill checker 42, so that only proper coins and/or bills are accepted. The coin and bill checkers may be of any suitable known type. The value of the coins and/or bills that have been accepted is converted by an encoder 43, 44 to a suitable, say, binary code. The monetary value of the coins is once stored in a register 46 through an OR circuit 45 and then stored in a register 21 through an adder 47 and an OR circuit 48. The value of the bills is once stored in the register 46 and then applied to the adder 47, which adds this value and the value of the coins stored in the register 21. The resultant sum is applied through the OR circuit 48 to register 21 to be stored therein in place of the value previously stored therein. The value stored is numerically indicated by a suitable indicator 49 of any known type.

A number allotter 50 selects a predetermined card identification number, which is converted by an encoder 51 to a corresponding suitable, say, binary code. The coded number is applied through the OR circuit 48 to the register 21 to be stored therein. The card identification number is also indicated by the indicator 49.

The selected card identification number and the monetary value are magnetically written on a card by a writing head 53. The information to be written on the card is on the other hand transferred from the register 21 through the transfer circuit 22 to the recorder 14. When the magnetic writing of the information on the card has been completed, a reading head 54 reads the information that has just been written on the card. The information read is applied through the OR circuit 45 to the register 46.

A comparator 55 receives the information stored in the register 21 (that is, the information to be written on the card) and the information stored in the register 46 (that is, the information that has actually been written on the card) and compares the two informations to see if they are identical. If they are, the comparator 55 produces an output on a line 56, which means that the necessary information has been properly and accurately written on the card. The output on the line 56 is used to actuate a suitable device, not shown, to dispense the card onto the customer.

The output on the line 56 is also applied back to the number alloter 50 to cause the same to choose a new identification number to be accorded to the next card.

If the above-mentioned two informations do not coincide, the circuit 55 produces no output on the line 56. This means that the writing of the required information on the card has not been properly made, so that no card will be dispensed.

Turning to FIG. 3, which shows the detailed arrangement of the article dispensation control device 12, when a purchaser puts a card into the machine, a card reading head 61 reads the identification number and the monetary value of the card introduced. The information that has been read is stored in a register 28. The monetary value of the card stored in the register 28 is numerically indicated on an indicator 62 similar to the previously mentioned indicator 49 on the one hand, and is applied to a comparator 63 on the other. The comparator 63 compares the value of the card and the price of the article to be sold, and if the former value is higher than the latter price, the comparator 63 produces an output, which causes a signal generator 64 to produce an article dispense signal to operate the article dispensing mechanism of the vending machine. The dispensing operation is quite the same as that of ordinary automatic vending machines. On the contrary, if the monetary value of the card introduced is less than the price of the article to be purchased, the circuit 64 is not actuated, so that no article is dispensed but the card is simply returned to its owner.

When the purchaser has selected an article, a price setting device 65 produces a signal corresponding to the price of the selected article, which is encoded by an encoder 66 and then applied through an OR circuit 67 to the register 27 to be stored therein. The monetary value of the card prior to use, that is, the value stored in the register 28 is applied to an adder 68, to which the price of the article purchased, that is, the value stored in the register 27 is also applied through a complementer 69. The adder 68 adds the value of the card and the complement of the price of the article. This means that the price of the article purchased is subtracted from the monetary value the card then has. The result of the subtraction is applied through the OR circuit 67 back to the register 27 to be stored therein. The stored value is written on the card by means of a writing head 70 in place of the monetary value the card had until then. When this rewriting operation of the card value has been completed, the reading head 61 reads the newly written value on the card and the value read is stored in the register 28. This value stored in the register 28 and the value stored in the register 27 are compared in a comparator 71. If the two values are found equal, it means that the rewriting of the card value has been correctly performed, so that the comparator 71 produces an output on a line 72, which actuates a suitable mechanism, not shown, to return the card the value of which has just been rewritten to its owner. If the two values are not equal, it means that the rewriting of the monetary value of the card has not been correctly performed so that the card is not returned.

The card identification number stored in the register 28 and the remaining monetary value of the card stored in the register 27 are applied to the recorder 14 through the OR circuit 29 and transfer circuit 30. It would be convenient to transfer and record the price of the article sold stored in the register 27.

FIG. 4 shows the detailed arrangement of the card-to-cash conversion control device 13. When a card is presented to the machine for exchange for cash, a reading head 82 reads the identification number and the monetary value of the card, and the information read is stored in a register 31. The monetary value stored in the register 31 is compared by a comparator 84 with a predetermined value set by an exchange limit setting device 83. The comparator 84 is so designed that it produces an output signal only when the value of the card is less than the preset exchange limit. The output signal is then applied to a decoder 85 which converts the coded monetary value of the card to a corresponding amount of money, on the basis of which a cash dispenser 86 dispenses cash money corresponding to the value of the card onto the customer. The output from the comparator 84 may be used to actuate a device, not shown, for collecting the card into the machine so as not to be returned to the customer.

When the operation of converting the card to cash has been completed, the information stored in the register 31 is transferred through the transfer circuit 32 to the recorder 14 to be recorded therein in the same manner and for the same purpose as previously mentioned.

What we claim is:

1. An automatic vending system comprising, in combination: a card issuance control device including means for magnetically recording on a card the monetary value corresponding to the value of the money deposited in said card issuance control device, means for storing said monetary value, means for reading the recorded value of said monetary value, means for comparing said stored value and said recorded value, means for producing an output signal if said recorded value equals said monetary value, and means for issuing said card in response to said output signal to said customer; an article dispensation control device including means for magnetically reading the recorded monetary value of a card accepted by said article dispensation device, means for comparing said monetary value and the price of an article that has been selected by a customer and producing a signal when said former value is equal to or greater than said latter price, means operable in response to said signal to cause said selected article to be dispensed and means operable in response to said signal for magnetically rewriting the value of said card so that said card has a rewritten value corresponding to a new value equal to the difference between said value that said card had prior to said purchase and the price of said article; and a card-to-cash conversion control device including means for magnetically reading the recorded monetary value of a card presented thereto, and means for dispensing cash corresponding to the value that has been read by said last-named reading means.

2. The apparatus of claim 1, wherein said card-to-cash conversion control device further includes means for preventing the cash dispensing operation of said cash dispensing means when the monetary value of a card presented to said last-named control device exceeds a preset value.

3. The apparatus of claim 1, wherein said article dispensation control device further includes means producing an output signal if said rewritten value of said card equals said new value, and means responsive to said output signal for returning the card to the customer.

* * * * *